UNITED STATES PATENT OFFICE.

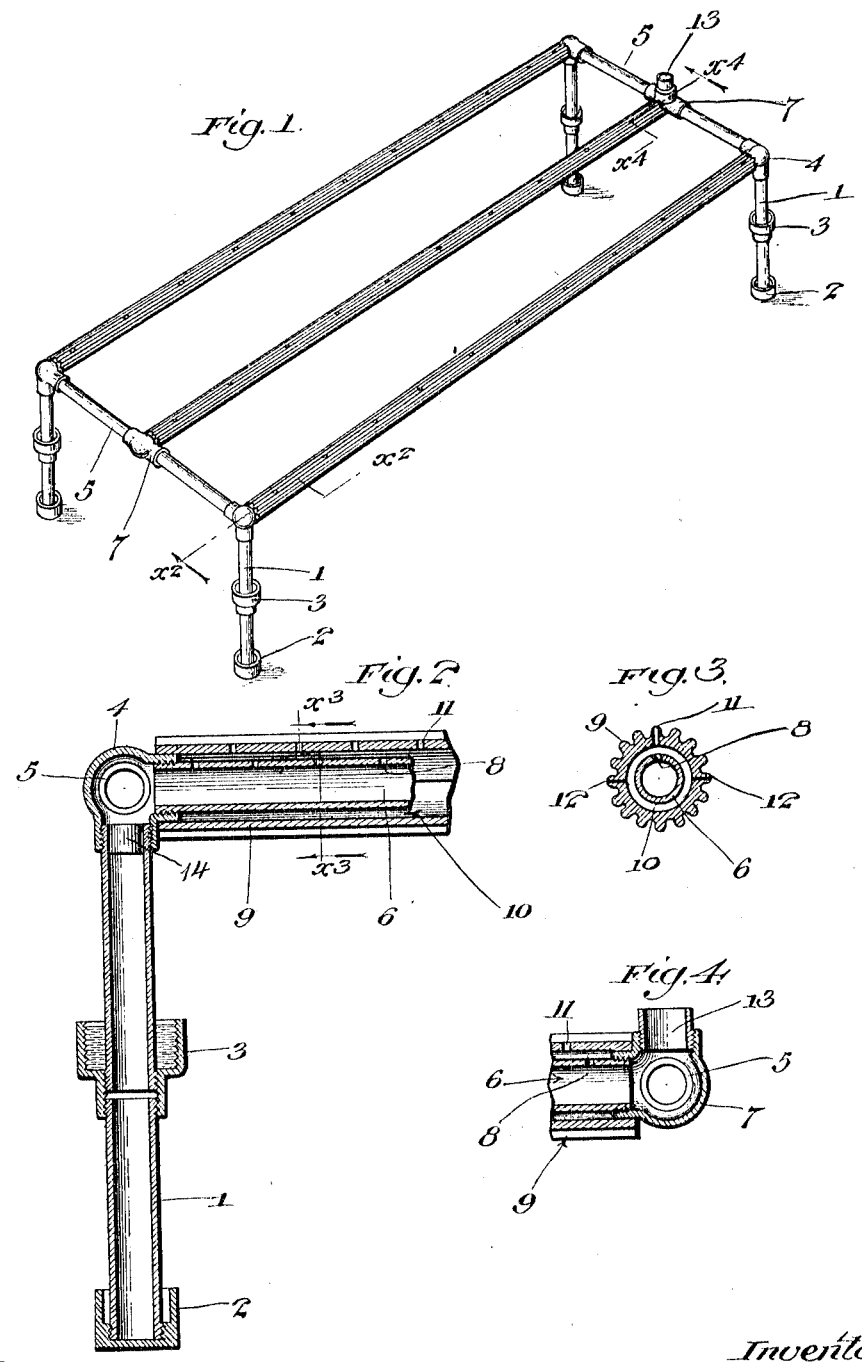

STELLA P. HINDLEY, OF HELENA, MONTANA.

DISINFECTING POULTRY-ROOST.

1,120,308.  Specification of Letters Patent.  Patented Dec. 8, 1914.

Application filed April 1, 1913. Serial No. 758,269.

*To all whom it may concern:*

Be it known that I, STELLA P. HINDLEY, a citizen of the United States, residing at Helena, in the county of Lewis and Clark, in the State of Montana, have invented a new and useful Disinfecting Poultry-Roost, of which the following is a specification.

This invention relates to poultry roosts and has for its object to so construct the roosts that the fowls while roosting thereon will be subjected to the evaporating action of a disinfectant contained in the roost which will destroy any vermin with which the fowls may be infested.

A further object is to prevent spiders or other insects from crawling up onto the roost.

Referring to the drawings: Figure 1 is a perspective view of one form of roost. Fig. 2 is an enlarged section on line $x^2$—$x^2$, Fig. 1. Fig. 3 is a section on line $x^3$—$x^3$, Fig. 2. Fig. 4 is a section on line $x^4$—$x^4$, Fig. 1.

The roost comprises vertical legs 1, formed of pipe, the lower ends resting in cups 2. Each leg is preferably formed in two sections which are screwed into an internally threaded cup 3. The upper ends of the legs are screwed to corner fittings 4. 5 are end pipes extending between the corner fittings, and 6 designates longitudinal pipes, two of which extend between the corner fittings and a third extends between tees 7 screwed to the pipes 5. The pipes 6 are perforated at the top as at 8 and are covered with a wooden casing 9 which does not lie close against the pipe 6, but is supported by the fittings 4, thus forming an annular space 10, around the pipes 6. The casing 9 is also perforated as at 11 and as these perforations communicate with the annular space 10, they need not necessarily be in line or in registry with the perforations 8. The casing 9 is also preferably externally corrugated as clearly shown in Fig. 3. The casing 9 may be formed in two semi-circular sections which are glued together at 12, as indicated in Fig. 3.

The roost thus constructed comprises a hollow framework and is adapted to be filled with a liquid disinfectant which may be poured in through a filling nipple 13 projecting from one of the tees, as shown in Fig. 1. This liquid will pass into all of the horizontal pipes 6 and 7, but is kept from descending into the legs by plugs 14 in the upper ends of pipes 1. The disinfectant may also be placed in the cups 3. The fumes arising from the disinfectant within the pipes passes up through the perforations 8, thence into the annular space 10 and thence out through the perforations 11, and as the fowls roost on the horizontal rods, they are subjected to the fumes which arise and the vermin are exterminated.

What I claim is:

A disinfecting poultry roost comprising a horizontal tube, means for supporting the tube, said tube being adapted to receive a disinfecting liquid and having perforations in its wall for the escape of fumes from the disinfectant, and a casing surrounding the horizontal tube with a space between the casing and tube, said casing being perforated in its upper wall only for the escape of the fumes.

In testimony whereof, I have hereunto set my hand at Los Angeles, California this 26th day of March, 1913.

STELLA P. HINDLEY.

In presence of—
GEO. T. HACKLEY,
MARTHA M. LANGE.

Copies of this patent may be obtained for five cents each, by addressing the "Commissioner of Patents, Washington, D. C."